United States Patent
Kee (10) Patent No.: US 9,325,378 B2
(45) Date of Patent: Apr. 26, 2016

(54) COMPUTING DEVICE MULTIPLE DISPLAY TOPOLOGY DETECTION OVER RADIO

(75) Inventor: Tommy Kee, Richmond (CA)

(73) Assignee: Broadcom Corporation, Irvine, CA (US)

( * ) Notice: Subject to any disclaimer, the term of this patent is extended or adjusted under 35 U.S.C. 154(b) by 635 days.

(21) Appl. No.: 13/160,218

(22) Filed: Jun. 14, 2011

(65) Prior Publication Data

US 2012/0322367 A1 Dec. 20, 2012

(51) Int. Cl.
*H04B 5/00* (2006.01)
*H04B 17/00* (2015.01)

(52) U.S. Cl.
CPC .............. *H04B 5/00* (2013.01); *H04B 17/0042* (2013.01); *H04B 17/0072* (2013.01)

(58) Field of Classification Search
CPC ..... H04W 4/023; H04W 4/025; H04W 4/008; H04W 88/06; H04B 17/0072
USPC ................. 455/41.1, 41.2, 566, 456.1, 404.2, 455/556.1, 556.2, 557, 456.3, 457; 345/204, 207; 348/14.8; 368/80, 113
See application file for complete search history.

(56) References Cited

U.S. PATENT DOCUMENTS

| | | | |
|---|---|---|---|
| 6,144,358 A * | 11/2000 | Narayanaswamy et al. .. | 345/102 |
| 7,126,588 B2 * | 10/2006 | Oakley ........................... | 345/169 |
| 7,289,083 B1 * | 10/2007 | Canova, Jr. .................... | 345/1.1 |
| 7,289,084 B2 * | 10/2007 | Lesniak ......................... | 345/1.1 |
| 8,108,872 B1 * | 1/2012 | Lindholm et al. ............ | 718/104 |
| 8,135,889 B2 * | 3/2012 | Crucs .............................. | 710/62 |
| 8,150,421 B2 * | 4/2012 | Ward et al. .................. | 455/456.5 |
| 8,171,421 B2 * | 5/2012 | Tapuska ........................ | 715/781 |
| 8,212,740 B1 * | 7/2012 | Harris ............................. | 345/1.1 |
| 8,217,964 B2 * | 7/2012 | Laine et al. .................... | 345/659 |
| 8,266,550 B1 * | 9/2012 | Cleron et al. .................. | 715/863 |
| 8,368,616 B1 * | 2/2013 | Harris ............................. | 345/1.1 |
| 8,384,615 B2 * | 2/2013 | Tan et al. ........................ | 345/1.1 |
| 8,396,888 B2 * | 3/2013 | Cheng et al. .................. | 707/774 |
| 8,402,372 B2 * | 3/2013 | Gillespie et al. .............. | 715/702 |
| 8,412,185 B2 * | 4/2013 | Cader et al. ................. | 455/426.1 |
| 8,412,269 B1 * | 4/2013 | Cook ............................. | 455/557 |
| 8,418,204 B2 * | 4/2013 | Pickelsimer et al. ........... | 725/42 |
| 8,423,911 B2 * | 4/2013 | Chaudhri ...................... | 715/835 |
| 8,434,018 B2 * | 4/2013 | Tapuska ........................ | 715/781 |
| 8,452,353 B2 * | 5/2013 | Crawford ...................... | 455/574 |
| 8,520,967 B2 * | 8/2013 | Bilcu et al. .................... | 382/254 |
| 8,700,789 B2 * | 4/2014 | Holden et al. ................. | 709/230 |
| 8,704,863 B2 * | 4/2014 | Santamaria et al. ....... | 348/14.01 |
| 8,713,473 B2 * | 4/2014 | Shah et al. .................... | 715/790 |
| 8,713,480 B2 * | 4/2014 | Flynt et al. .................... | 715/847 |
| 8,713,584 B2 * | 4/2014 | Harm et al. ................... | 719/320 |
| 8,713,621 B2 * | 4/2014 | White ........................... | 725/107 |
| 2010/0041378 A1 * | 2/2010 | Aceves et al. .............. | 455/414.1 |
| 2011/0105094 A1 * | 5/2011 | Hassan et al. ................. | 455/418 |
| 2012/0054337 A1 * | 3/2012 | Moritz et al. .................. | 709/224 |

* cited by examiner

*Primary Examiner* — Marceau Milord
(74) *Attorney, Agent, or Firm* — Sterne, Kessler, Goldstein & Fox PLLC (57) ABSTRACT

Methods and systems are disclosed for determining the positioning of computer display devices using transmitted radio signals. A computing device may receive a radio signal transmitted by a display device. Based on the received radio signal, the computing device may determine the position of the display device. The computing device may then output a video signal to the display device, based on the determined position. The video signal may include a user interface for the computing device according to the determined position. Changes in the position of the display device may be detected based on radio signals, and the output video signal may be changed as well.

20 Claims, 6 Drawing Sheets

COMPUTING DEVICE MULTIPLE DISPLAY TOPOLOGY DETECTION OVER RADIO

BACKGROUND

1. Field of the Invention

Embodiments relate to determining the position of display devices.

2. Background Art

Computing devices, such as desktop computers and laptop computers, may have the ability to utilize multiple discrete display devices, such as CRT monitors or LCD panels, to increase the amount of user interface space that a user can view. For example, a desktop computer user may use two monitors and typically have an e-mail program displaying on one monitor, and a word processing program displaying on the other. Similarly, a laptop user may extend the usable display of the laptop by connecting a LCD panel.

Configuring the positioning of multiple displays is typically done using menu options or other configuration options provided by a user's operating system. An operating system's display preferences may allow the user to select whether a particular display is to the right or to the left of another display, which display should be used as the primary display, and other similar options.

As the price of such displays has been decreasing, more users have been using multiple displays. Users not familiar with the various display options provided by an operating system may find it difficult or confusing to configure the positioning of their display devices. Further, as the number of displays a user has grows, the complexity of the menu options similarly grows. Displays may be moved from one position to another. Each time a display is moved, a user may need to reconfigure the menu options in the operating system. Thus, what is needed are a method and system of automatically configuring positioning of display devices.

BRIEF SUMMARY

Disclosed herein are systems and methods for configuring display device positioning using radio signals. A computing device may include a radio receiver that receives radio signals from one or more display devices. Based on the received radio signal, a positioning module may determine the position of a display device. A video output unit may output a user interface according to the determined position of the display device.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The number of computer users with multiple displays has been growing quickly. In certain situations, the cost of two smaller displays may be less than the cost of one large display. Multiple displays also allow for greater flexibility. Multiple displays connected to a single computing device may allow a user to view a user interface as a contiguous mesh, where the user can move visual objects, such as windows, across display boundaries.

Users with multiple displays often have their own preferences for the configuration of the multiple displays. For example, a user with two displays may prefer that her application launcher, dock, or task bar be presented on the display to her left, and also may specify that she wishes for her programs to open on the right side display by default. The two displays may also be of different sizes, resolutions, or may differ in many other characteristics. As an example, the left display may be a 17" LCD monitor, while the right display may be a 23" LCD monitor.

Figure 1A:
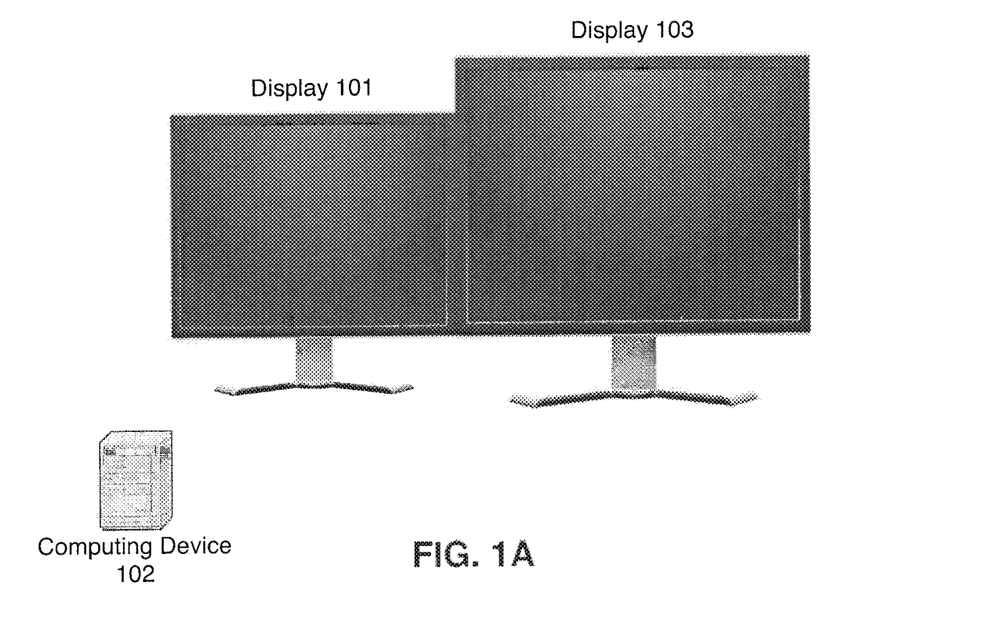
FIGS. 1A-1C are examples of display configurations.

FIG. 1A is a diagram of such a sample display configuration. Display 101 and display 103 may present a user interface of an operating system in accordance with known techniques. Display 101 and display 103 may be connected to computing device 102 by one or more VGA cables, DVI cables, or other connection technique. As seen in FIG. 1A, display 101 and display 103 may be of different sizes.

When connecting multiple displays to a computing device, for an optimal user experience, the user may need to specify various settings in the operating system of the user's computing device. The operating system of the user's computing device may allow a user to specify these settings, for example and without limitation, in display preferences or display configuration menu.

For example, the user may need to specify to the operating system of the computing device the absolute or relative position of each display. In the example above, after both displays are connected, the user may specify that display 101 is placed on the left, and display 103 is placed on the right, to be able to manipulate windows between the two displays. Similarly, if a user has a laptop computer and connects an external display, she may specify where the external display is located relative to the laptop display. The user may also specify whether she wishes to mirror the contents of one display on the other.

Specifying where the displays are located relative to one another or relative to a computing device may be necessary when using functionality provided by an operating system. For example, an operating system may allow a user to drag an application window from one monitor to another. In the example of FIG. 1A, if a user wishes to move an application window from display 101 to display 103, the user may perform this action by moving the window towards the right edge of display 101 and on to display 103.

Figure 1B:
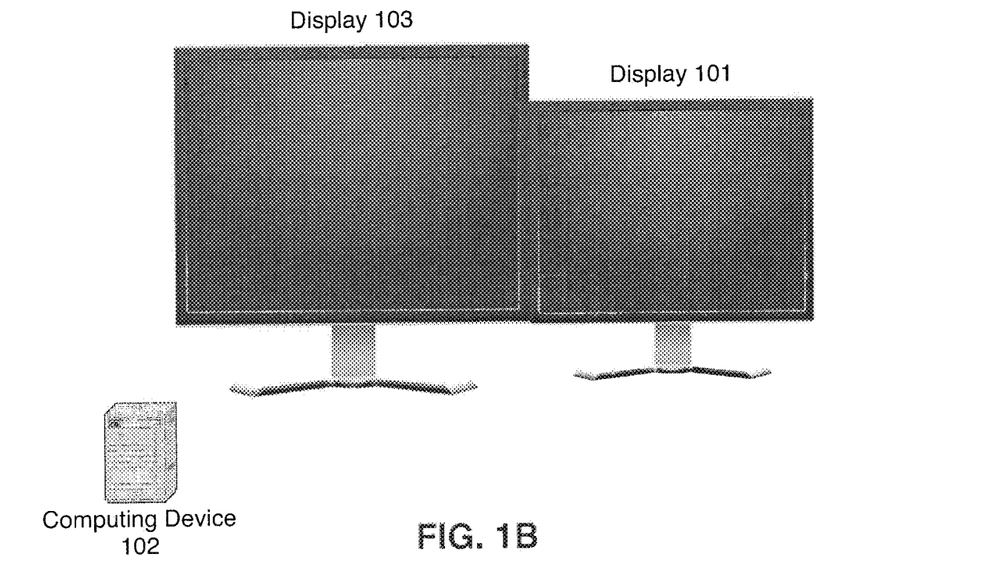

However, this requires that the operating system be aware of the relative positioning and configuration of display 101 and display 103. If the user wishes to modify the positioning of the displays, for example, to the positioning shown in FIG. 1B, the configuration may need to be manually updated. For example, the user may wish to switch the positioning to where display 103 is on the left, and display 101 is on the right. Once the user has done so, if the user tries to move a window of the user interface from display 103, to the right to be placed on display 101, the user may not be able to do so without changing the configuration of the displays in the operating system configuration on computing device 102, so that the computing device 102 is aware of the positioning of the displays.

Figure 1C:
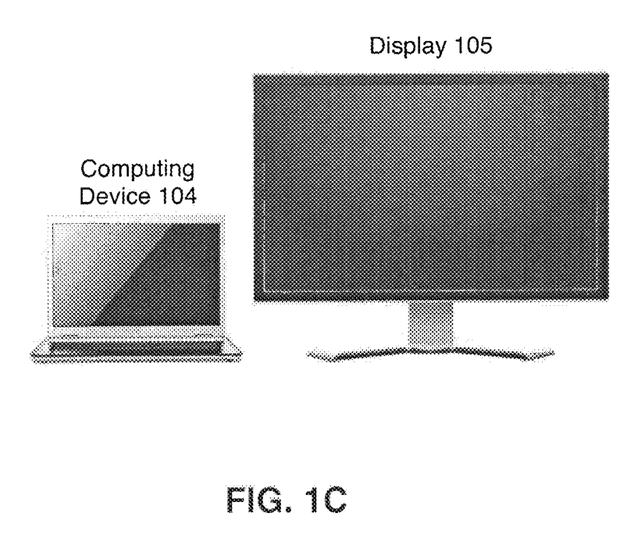

FIG. 1C is a diagram of a further sample display configuration. FIG. 1C includes portable computing device 104 and display 105. Portable computing device 104 may be a laptop computer, tablet computer, or mobile telephone. Display 105 may be connected to portable computing device using known techniques, such as a VGA or DVI connection, or by a wireless display technology. Depending on the configuration of portable computing device 104 and display 105, display 105 may extend the display of portable computing device 104 or mirror the current contents of the display of portable computing device 104. Similar to FIG. 1A, if the positioning of display 105 is changed, the configuration of portable computing device 104 may need to be manually changed.

Embodiments provide for the automatic determination of display layout. Thus, in accordance with embodiments, if a user wishes to use multiple displays, a computing device may be able to automatically determine where the displays are and allow movement of graphical elements/objects (e.g. windows) from one display to another without requiring that the user manually specify the displays' arrangement in the computer operating system. Further, in accordance with embodiments, if a user changes the positioning of a display, the computing device may automatically detect such a change and modify its configuration to properly distribute a video signal to each of the displays.

Computing Device

Figure 2:
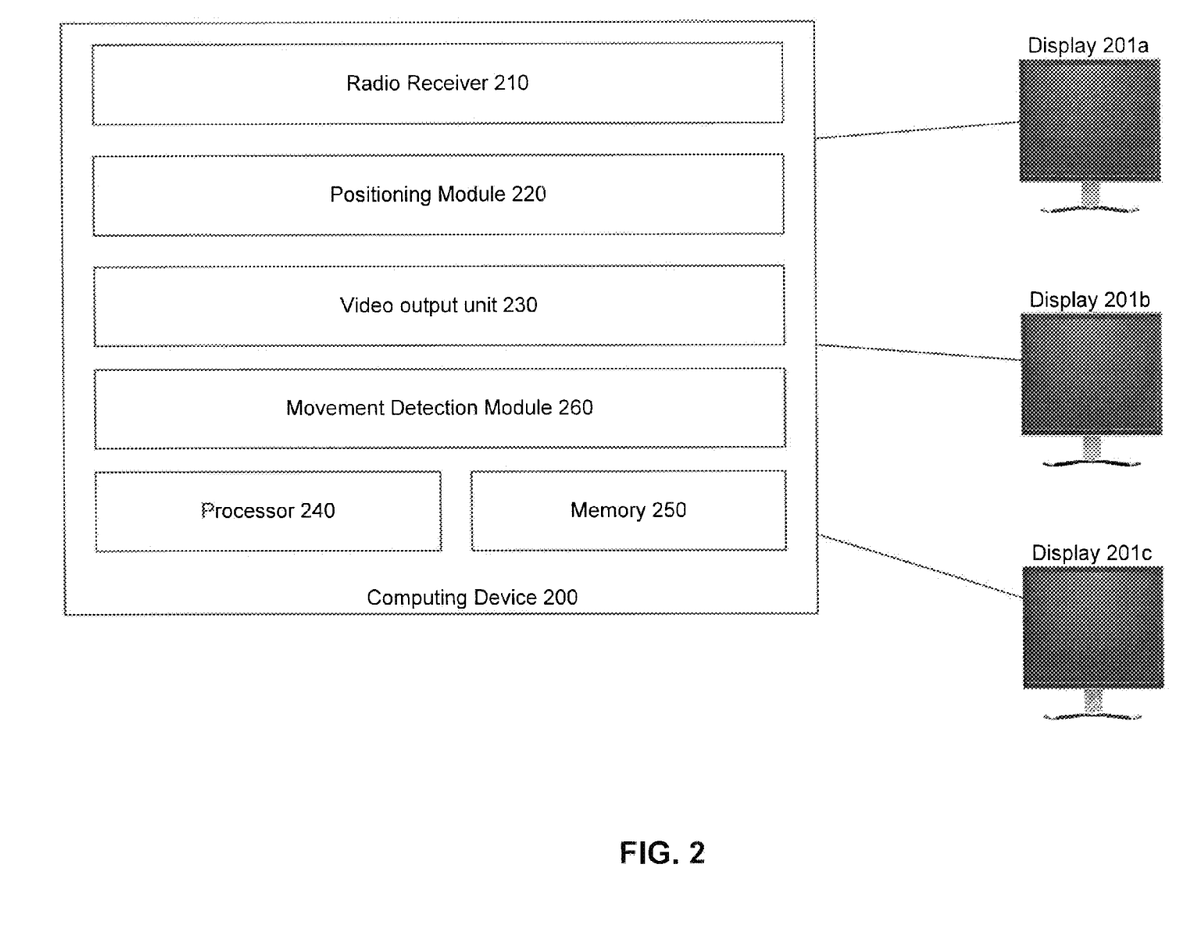
FIG. 2 is a diagram of a computing device in accordance with embodiments.

FIG. 2 is a diagram of a computing device 200 in accordance with embodiments. Computing device 200 may be, for example, a laptop computer, desktop computer, tablet computer, mobile device, or any other type of computing device. Computing device 200 may be connected to one or more displays 201a-201c.

Computing device 200 includes radio receiver 210. Radio receiver 210 may be configured to receive radio signals such as, for example and without limitation, Bluetooth signals, near field communication signals, or Wi-Fi (802.11) signals, and the like. Radio receiver 210 may include one antenna or may include an antenna array including multiple antennae in a specific configuration. Radio receiver 210 may be integrated into computing device 200, or may be connected to computing device 200 using a USB, IEEE 1394, or other type of connection.

Computing device 200 also includes positioning module 220. Positioning module 220 may be configured to determine the position of a radio signal received by radio receiver 210 that is sent by display device 201a-c. Positioning module 220 may, in part, determine the position of the determined radio signal by estimating the angle of arrival of the radio signal, or by determining the strength of the received radio signal. In embodiments, the positioning of display devices 201a-c by positioning module 220 is determined based on the angle of arrival of a radio signal using known phased array position determining techniques. Specifically, the radio signal may be received by two or more antennas of an antenna array, resulting two or more electrical signals having a relative phase delay determined by the relative times of arrival that the radio signal is received at the respective antennas. If the spacing between the antennas is known, then basic trigonometry can be used to calculate the angle of arrival (in degrees) of the radio signal relative to the antenna array. The angle of arrival then accurately represents the position of the displays 201a-c relative to the position of the computing device 200 (e.g. left, right, 45 degrees off broadside, etc.) Determining the angle of arrival of a radio signal is described further in commonly-owned, currently pending application titled "Methods and Systems for Estimating Angle of Arrival", U.S. patent application Ser. No. 12/895,497 (filed Sep. 30, 2010), which is hereby incorporated by reference.

Computing device 200 also includes video output unit 230. Video output unit 230 may be configured to output a display signal provided by other elements of computing device 200, such as processor 240, to a monitor or other computer display 201. Video output unit 230 may be connected to one or more displays 201 by way of a VGA connector, a Digital Visual Interface (DVI) output, composite video output, component video output, S-Video output, High-Definition Multimedia Interface (HDMI) output, or DisplayPort output. Video output unit 230 may also be connected to one or more displays 201 via a Universal Serial Bus (USB) connection. Computing device 200 may include multiple video output units 230.

Video output unit 230 may be, in embodiments, a video card or video adapter. For example, video output unit 230 may be a PCI-X or AGP video adapter for a desktop computer. Video output unit 230 may also be integrated into a laptop or desktop computer processor. Video output unit 230 may also be a wireless display transmitter based on the WirelessHD specification.

Computing device 200 also includes processor 240 and memory 250. Processor 240 may be a general purpose or special purpose processor that executes applications and instructions stored on memory 250. Memory 250 may be any type of persistent memory. Memory 250 may store, for example and without limitation, instructions that cause processor 240 to operate as a positioning module 220 and that cause computing device 200 to output a video signal via video output unit 230.

Display Device

Figure 3:
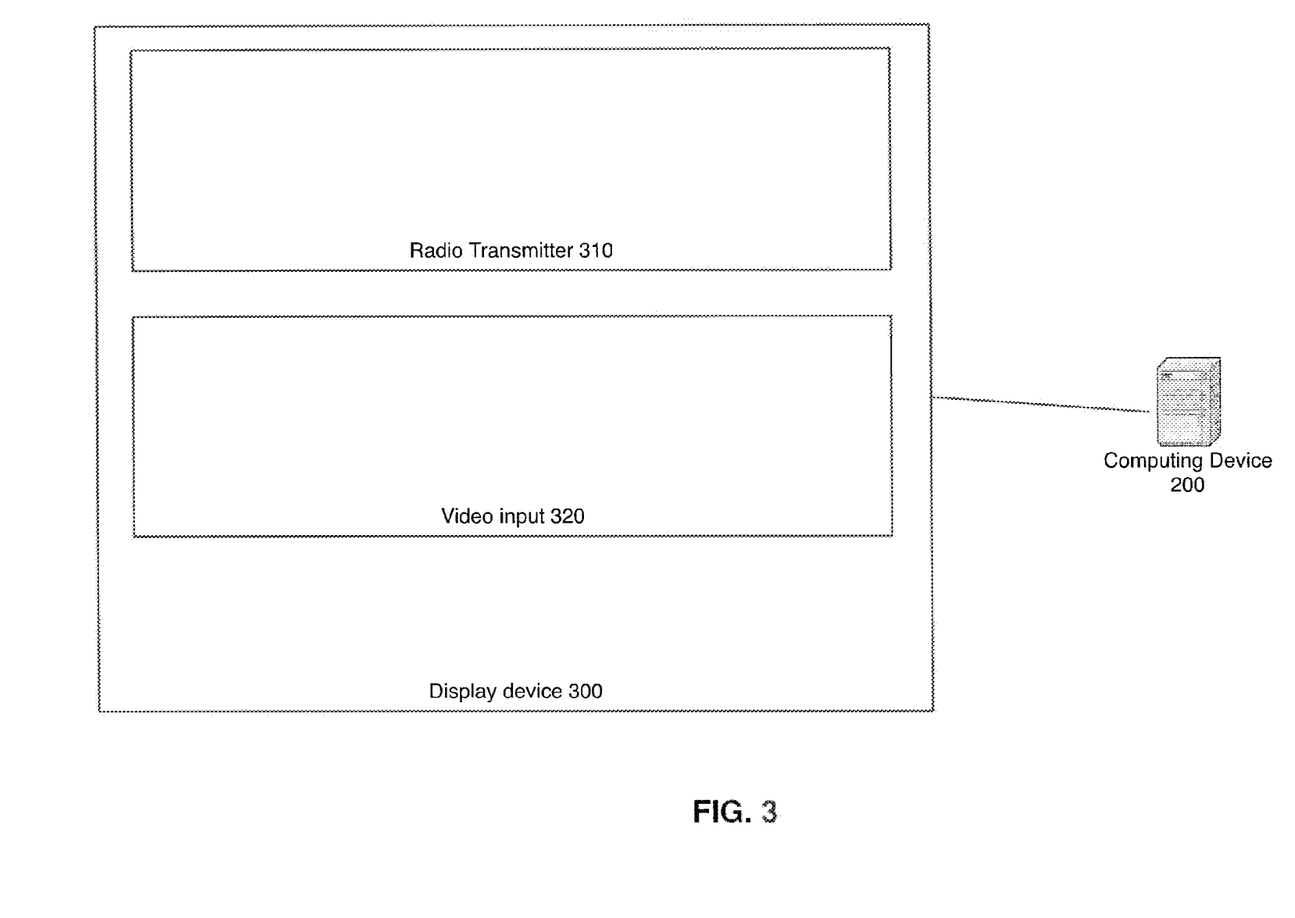
FIG. 3 is a diagram of a display device in accordance with embodiments.

FIG. 3 is a diagram of a typical display device 300. For example, displays 201a-201c may include components of display device 300. Display device 300 may be a computer monitor, such as an LCD display, or an OLED display. Display device 300 may also be a television, such as an LCD television, plasma television, or DLP television. Display device 300 may also be a LCD or DLP projector.

Display device 300 includes radio transmitter 310. Radio transmitter 310 may be configured to transmit radio signals such as, for example and without limitation, Bluetooth signals, near field communication signals, or Wi-Fi (802.11) signals. Radio transmitter 310 may include one or more antennae. Radio transmitter 310 may be integrated into display device 300 or connected to display device 300 by known connection techniques. Transmitted radio signals may contain a unique identification for the display device 300 that is known a-priori by the computing device 200.

Display device 300 also includes a video input 320. Video input 320 may be configured to accept video signals from, for example and without limitation, a VGA input, DVI input, composite video input, component video input, S-Video input, HDMI input, or DisplayPort input.

Method

Figure 4:
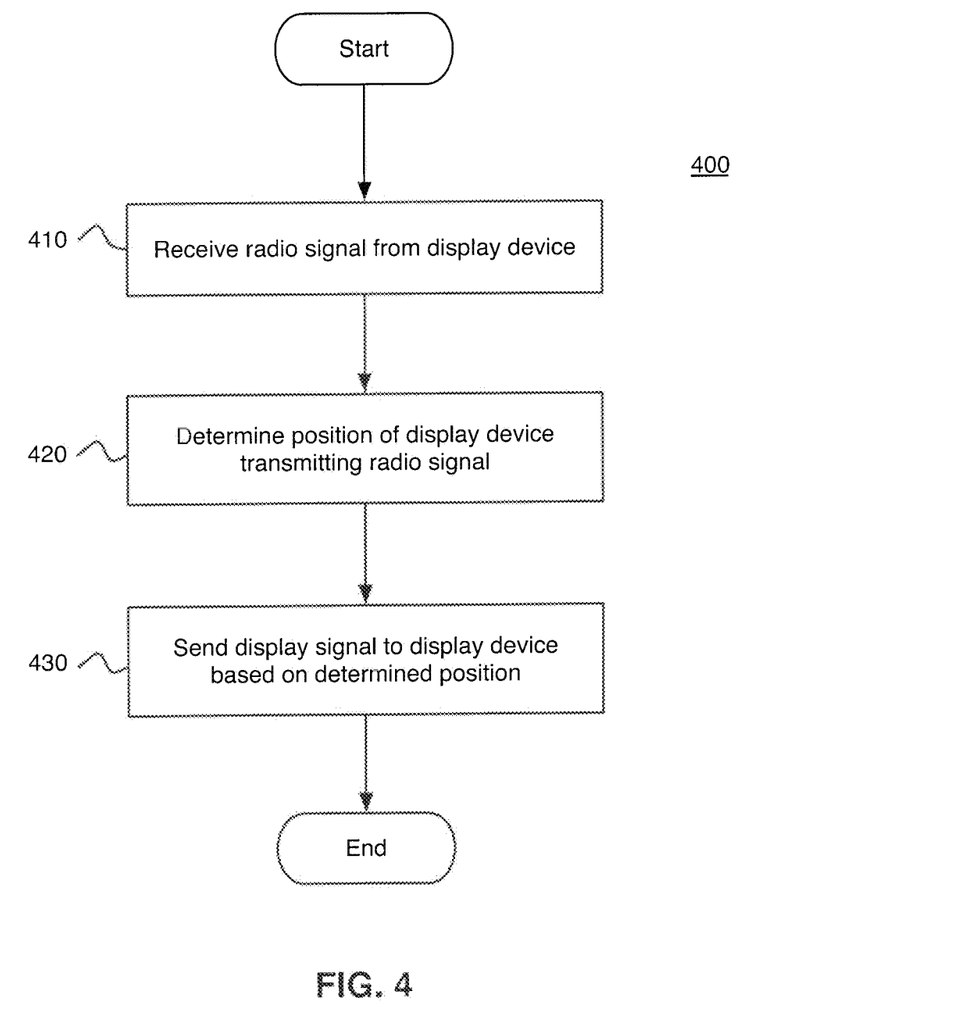
FIG. 4 is a flow diagram of a method of determining display device placement in accordance with embodiments.

FIG. 4 is a flow diagram of a method 400 of determining the positioning of a display device, in accordance with embodiments. Method 400 may be implemented by and executed by a computing device containing elements of computing device 200.

At block 410, a radio signal is received from one or more display devices. Radio signals may be received from display devices implementing elements of display device 300. The radio signal may be received after the one or more display devices is connected to computing device 200 using video output unit 230.

As described above, the radio signal may be a Bluetooth signal, NFC signal, or Wi-Fi signal. In one embodiment, multiple radio receivers may be implemented at computer device 200 to address multipath issues. Likewise, multiple transmitters may be implemented at the display devices. The particular type of signal received may be dependent on a number of factors. For example, Bluetooth signals may be used for computing devices such as laptop computers. A NFC signal may be used for computing devices such as mobile telephones or tablet computers. Wi-Fi signals may be used for desktop computers. However, such signals are not limited to the examples given above.

At block 420, the positioning of the display device transmitting the radio signal is determined. The absolute position of the display device may not be necessary. However, the relative position of the display device, with respect to other display devices or with respect to the computing device may be determined. For example, in the configuration of FIG. 1A, the positioning of display 101 may be determined to be to the left of display 103, based on the received radio signal. In the configuration of FIG. 1C, the positioning of display 105 may be determined to be to the right of computing device 104, based on the received radio signal.

At block 430, a display signal is sent to the display device, based on the position of the display device determined in block 420. For example, a video output unit 230 may output a DVI signal to a video input 320 of a display device 300 at block 430.

The display signal seat to the display device may reflect the determined position of the device. For example, in the configuration of FIG. 1C, the display signal sent from computing device 104 to display device 105 may allow a user to extend the user interface of computing device 104 and move windows or other user interface elements from computing device 104 to display device 105, as described above. In embodiments, upon determining the position of the display device in block 420, a computing device may inform an operating system or applications of the determined position of the display device, such that video output unit 230 may send an appropriate display signal at block 430.

EXAMPLES

An example use case of method 400 follows. A user may have a laptop computer that implements elements of computing device 200. For example, the laptop computer may have a radio receiver 210, such as a Bluetooth receiver.

Typically, the user may rely only on the display integrated in the laptop computer. However, the user may have a second display device, such as a LCD monitor, in her office which she wishes to use to view documents and other data on a larger screen. The monitor may implement components of display device 300, such as radio transmitter 310 and video input 320. Thus, the user may connect such a monitor to her laptop computer, using video input 320.

Once the user has connected the monitor, radio receiver 210 of her laptop computer may begin receiving radio signals transmitted by radio transmitter 310, in accordance with block 410 of method 400. Further, in accordance with block 420, positioning module 220 of the user's laptop computer may determine the relative position of the monitor. For example, the positioning module 220 may determine that the connected monitor has been placed to the left of the user's laptop computer.

Thus, in accordance with block 430, video output unit 230 of the user's laptop computer may output a video signal to a video input 320 of the LCD monitor, based on the determined position of the monitor. That is, if the LCD monitor is placed to the left of the user's laptop computer, video output unit 230 of the user's laptop computer may output a video signal to video input 320 of the LCD monitor that extends the GUI of the operating system, such that the user can move graphical elements from the laptop display to the LCD monitor from right to left, as described above.

In embodiments, method 400 may also be used to extend the usable display area of tablet devices or mobile devices such as smartphones. Such devices typically have small screens and may be unsuitable for viewing large spreadsheets, presentations, or videos and other media. Thus, in embodiments, a mobile device may be able to display a user interface or other information or an external display. In accordance with block 410 and block 420 of method 400, the mobile device may determine the position of such an external display by a received radio signal. Further, the mobile device may be connected to an external display and output a video signal via WirelessHD, HDMI, or other type of connection suitable for a mobile device, in accordance with block 430. By determining the position of an external display, the operating system of the mobile device may be able to adapt a graphical user interface to allow improved user interaction with the external display.

The steps of method 400 may be executed when a display device is first corn to a computing device. In a further embodiment, a position change of a display device may be detected, and the signals sent to the display device may change. Thus, in an embodiment, radio receiver 210 may receive signals from a radio transmitter 310 on a time interval. For example, a display device 300 may output radio signals via radio transmitter 310 every 15 seconds, or at any other desired interval. A radio receiver 210 of a computing device 200 may receive these signals to determine the positioning of the display device 300.

A movement detection module 260 may operate in conjunction with positioning module 220 to determine whether the position of the signals transmitted from a radio transmitter 310 of a display device 300 has changed. If movement detection module 260 determines that the positioning of the signals has changed, the user interface output by the video output unit 230 may be modified. For example, if the user changes the physical positioning of display devices from the configuration of FIG. 1A to the configuration of FIG. 1B, a movement detection module may detect this movement and appropriately instruct a video output unit to output signals corresponding to the present configuration of the displays. In another example referring to FIG. 1C, assume that a user is operating a portable computing device 104 (e.g. laptop, mobile phone) in conjunction with a fixed display 105 and a user then moves the device 104 from a first location to a second location in a room, so that the position relative to the fixed display 105 has changed. The movement detection module may detect this movement using the techniques described herein and appropriately instruct the video output unit to output signals corresponding to the present configuration of the displays, and therefore allow the user to move windows from one display to the other in an accurate manner.

In an embodiment, the user interface output by video output unit 230 only changes if movement detection module 260 detects an amount of movement that meets or exceeds a threshold. For example, movement detection module 260 may only instruct video output unit 230 to change the user interface output if the movement is greater than, for example or without limitation, twelve inches. The threshold may also be based on the particular size of the display that is moved and the size of the other displays. For example, if the display is a 15" monitor, any movement under 15" may not meet the threshold.

Although embodiments are described with respect to two displays, embodiments may be utilized with a greater number of displays. For example, users may have three or more displays. A positioning module may determine the position of each display and accordingly a video output unit may display a user interface on each display device according to the determined positions. In embodiments, as described above, radio signals transmitted from a display device may uniquely identify the display device. Such a unique identification may assist a computing device in determining the location of a specific display device.

Computer System

Figure 5:
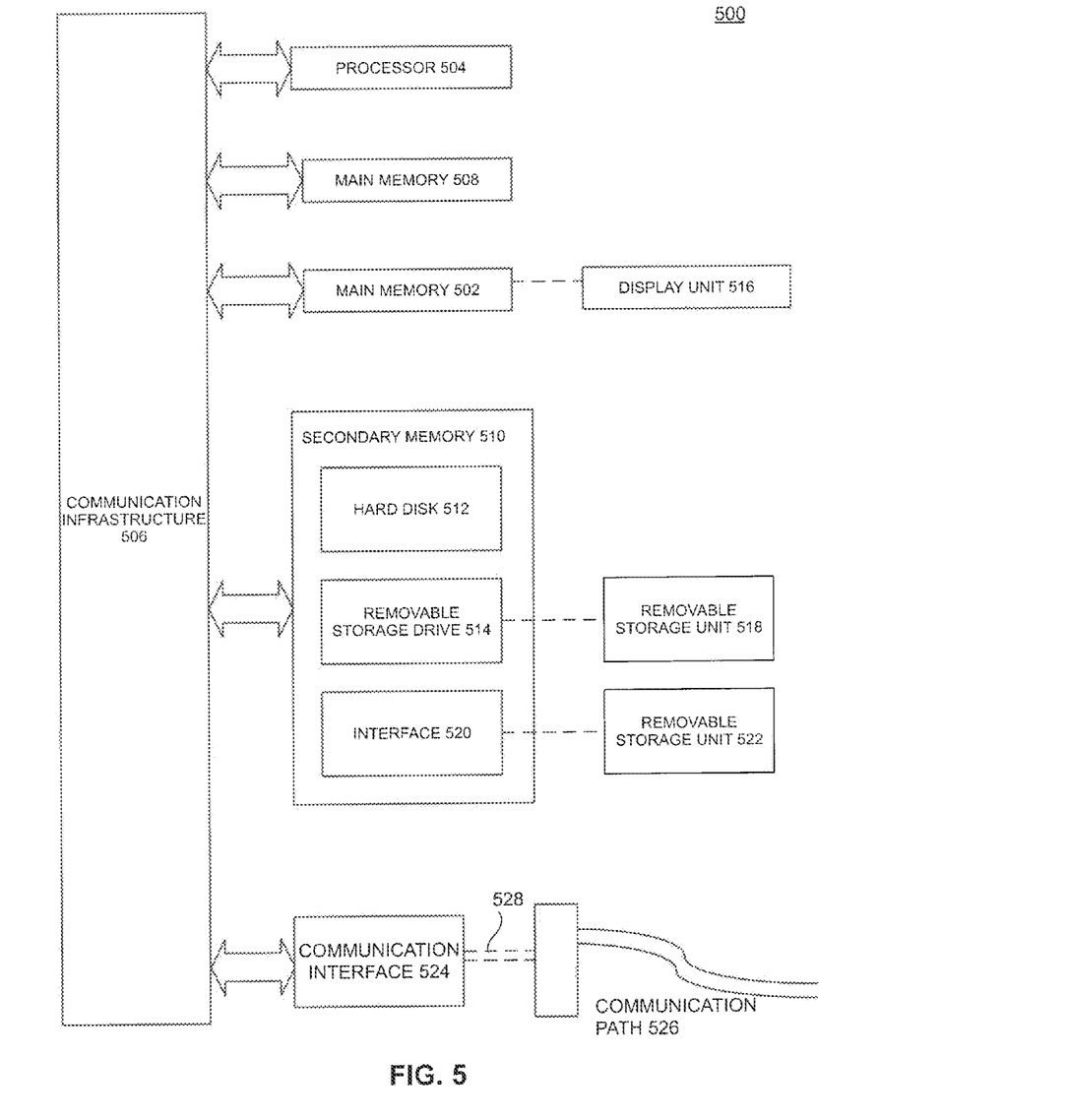
FIG. 5 is a diagram of a computing device that may be used to implement embodiments.

Various aspects of the present invention can be implemented by software, firmware, hardware, or a combination thereof. FIG. 5 illustrates an example computer system 500 in which the present invention, or portions thereof, can be implemented as computer-readable code. For example, the methods illustrated by flowchart 400 of FIG. 4 can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the methods illustrated by flowchart 400 of FIG. 4, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computing device, comprising:
    a radio receiver configured to receive a radio signal from a display device that is external to the computing device;
    a positioning module configured to determine a position of the display device relative to a position of the computing device based on the received radio signal; and
    a video output unit configured to display a user interface on the display device according to the determined position.

2. The computing device of claim 1, wherein the radio receiver comprises a Bluetooth receiver.

3. The computing device of claim 1, wherein the radio receiver comprises a near field communications receiver.

4. The computing device of claim 1, wherein the radio receiver comprises an 802.11 receiver.

5. The computing device of claim 1, wherein the positioning module is configured to determine the position of the display device based on an angle of arrival of the received radio signal.

6. The computing device of claim 1, wherein
    the position of the display device is a first position, and
    the positioning module is further configured to determine a second position of the display device based on another received radio signal, the position module further comprising:
        a movement detection module configured to detect movement of the display device when a distance between the second position of the display device and the first position of the display device exceeds a threshold, wherein
    the video output unit is further configured to display, based on the detected movement, the user interface on the display device according to the second position.

7. A method of determining a position of a display device, the method comprising:
    receiving, using a computing device, a radio signal from the display device;
    determining a position of the display device relative to the computing device based on the received radio signal; and
    sending a display signal to the display device according to the determined position.

8. The method of claim 7, wherein the position of the display device is a first position, and wherein the method further comprises:
    detecting a movement of the display device;
    determining a second position of the display device based on another received radio signal; and
    sending another display signal to the display device according to the determined second position.

9. The method of claim 7, further comprising:
    determining a second position of the display device based on another received radio signal; and
    detecting a movement of the display device when a distance between the determined second position and the determined position exceeds a threshold.

10. The method of claim 7, wherein the radio signal is a Bluetooth signal.

11. The method of claim 7, wherein the radio signal is a near field communication signal.

12. The method of claim 7, further comprising:
    determining the position of the display device based on an angle of arrival of the received radio signal.

13. A computing device, comprising:
    a radio receiver configured to receive a radio signal from a first display device;
    a positioning module configured to determine, based on the received radio signal, a position of the first display device relative to:
        a position of the computing device, and
        a position of a second display device; and
    a video output unit configured to display a user interface on the first display device based on the position of the computing device, the position of the first display device, and the position of the second display device.

14. The computing device of claim 13, wherein the first display device and the second display device are coupled to the computing device.

15. The computing device of claim 13, wherein the radio receiver is further configured to receive a second radio signal from the second display device, and wherein the positioning module is further configured to:
    determine, based on the received second radio signal, the position of the second display device relative to:
        the position of the computing device, and
        the position of the first display device.

16. The computing device of claim 13, wherein the radio receiver is further configured to receive a second radio signal from the first display device, and wherein the computing device further comprises:
    a movement detection module configured to:
        determine, based on the second radio signal, a second position of the first display device, and determine, based on the position of the first display device and the second position of the first display device, whether a change in the position of the first display device exceeds a predetermined threshold, wherein the video output unit is further configured to display, based on the change in position of the first display device, the user interface on the first display device.

17. The computing device of claim 13, wherein the radio receiver is configured to receive the radio signal from the first display device over a short range wireless link.

18. The computing device of claim 13, wherein the first display device is external to the computing device.

19. A computing device, comprising:
   a radio receiver configured to receive:
      a first radio signal from a first display device, and
      a second radio signal from the first display device; and
   a positioning module configured to determine, based on the first radio signal, a position of the first display device relative to:
      a position of the computing device, and
      a position of a second display device; and
   a video output unit configured to display a user interface on the first display device based on the position of the computing device, the position of the first display device, and the position of the second display device; and
   a movement detection module configured to determine, based on the first radio signal and the second radio signal, whether a change in the position of the first display device exceeds a predetermined threshold.

20. The computing device of claim 19, wherein the movement detection module is farther configured to:
   instruct the video output unit to update the user interface in response to determining that the change in the position of the first display device exceeds the predetermined threshold.

* * * * *